United States Patent [19]

Schilling, Jr. et al.

[11] Patent Number: 5,275,980

[45] Date of Patent: Jan. 4, 1994

[54] SELF-CURING CERAMICIZABLE POLYSILOXANES

[75] Inventors: Curtis L. Schilling, Jr., Marietta, Ohio; Thomas C. Williams, Ridgefield, Conn.

[73] Assignee: Union Carbide Chemicals & Plastics, Danbury, Conn.

[21] Appl. No.: 923,457

[22] Filed: Aug. 3, 1992

Related U.S. Application Data

[62] Division of Ser. No. 627,578, Dec. 14, 1990, Pat. No. 5,162,480.

[51] Int. Cl.$^5$ .................................................. C03C 3/00
[52] U.S. Cl. ........................................ 501/87; 264/65; 423/337; 501/88
[58] Field of Search .................. 501/87, 88, 90, 92; 423/337; 528/33, 21, 32; 264/65

[56] References Cited

U.S. PATENT DOCUMENTS

| | | | |
|---|---|---|---|
| Re. 32,107 | 4/1986 | January | 501/12 |
| 2,714,099 | 7/1955 | Weyenberg | 260/46.5 |
| 3,843,702 | 10/1974 | de Montigny et al. | 260/448.2 |
| 4,222,952 | 9/1980 | Vick | 556/462 |
| 4,578,493 | 3/1986 | Chang | 556/451 |
| 4,581,391 | 4/1986 | Baldwin et al. | 523/179 |
| 4,634,610 | 1/1987 | Koehan et al. | 427/387 |
| 4,634,755 | 1/1987 | Hallgren et al. | 528/23 |
| 4,888,376 | 12/1989 | Atwell et al. | 524/401 |
| 4,981,820 | 1/1991 | Renlund | 501/39 |
| 5,081,199 | 1/1992 | Okinoshiwa | 528/15 |
| 5,130,400 | 7/1992 | Pachacy | 528/21 |

OTHER PUBLICATIONS

K. A. Andrianov, et al., Zhur. Obschch. Khim., 35, 103–106 (1965).
K. A. Andrianov, et al., Zhur. Obshch. Khim., 35, 524–527 (1965).
J. Organometal Chem., 4, 440–445 (1965).

*Primary Examiner*—Karl Group
*Assistant Examiner*—A. Wright
*Attorney, Agent, or Firm*—B. L. Deppenbrock

[57] ABSTRACT

Polysiloxanes containing both alkylhydrosiloxane units and alkylvinylsiloxane units which polysiloxanes are siloxy-endblocked that are useful as starting materials in the preparation of silicon oxycarbide ceramic compositions, a process for their preparation, a process for preparing silicon oxycarbide ceramic compositions therefrom, and novel silicon oxycarbide ceramic compositions are described.

7 Claims, No Drawings

SELF-CURING CERAMICIZABLE POLYSILOXANES

This application is a division of prior U.S. application Ser. No. 07/627,578, filing date Dec. 14, 1990, now U.S. Pat. No. 5,162,480.

BACKGROUND OF THE INVENTION

1. Field of the Invention

This invention relates to polysiloxanes containing both alkylhydrosiloxane units and alkylvinylsiloxane units which polysiloxanes are siloxy-endblocked. These polysiloxanes are useful as starting materials for silicon oxycarbide ceramic compositions. This invention also relates to a process for the preparation of such polysiloxanes, to a process for the conversion of such polysiloxanes to ceramic compositions, and to the ceramic compositions so prepared.

2. Description of the Prior Art

Polysiloxanes containing methylhydrosiloxane and methylvinylsiloxane units have been prepared as by-products in the preparation of cyclic siloxanes by hydrolysis of chlorosilanes (K. A. Andrianov, et al., Zhur. Obshch. Khim., 35, 103 (1965); 35 524 (1965); and J. Organometal Chem., 4, 440 (1965)). The polysiloxanes of the above references containing these units were hydroxy-endblocked, i.e. terminated by hydroxyl groups, and water is formed when such siloxanes are cured which is unacceptable in ceramic processing (U.S. Pat. No. 2,714,099). Moreover, these polysiloxanes did not contain essentially equimolar amounts of the methylhydrosiloxane and methylvinylsiloxane units. The cyclic siloxane of these references is not useful in ceramic compositions and must be removed.

U.S. Pat. No. 4,578,493 discloses polysiloxanes containing methylhydrosilane and methylvinylsiloxane units in combination with other units, especially dimethylsiloxane units which polysiloxanes are silyl-endblocked. These polysiloxanes are prepared by the cohydrolysis of Me$_3$SiCl, MeSiHCl$_2$, MeSiCl$_2$CH=CH$_2$, Me$_2$SiCl$_2$ and HSiCl$_3$ and are used as release coatings at ambient temperatures. The polysiloxanes of this reference contain a large number of dimethylsiloxane units and, thus, are not suitable for ceramic applications.

It is also known that polysiloxanes containing methylhydrosiloxane units are usually equilibrated with an acid catalyst, while polysiloxanes containing methylvinylsiloxane units are usually equilibrated with a base catalyst (*The Chemistry and Technology of Silicones*, W. Noll, 2nd edition,, (Academic Press: 1968), p.219-229). Further, it does not appear that any single catalyst has been shown to be effective in preparing polysiloxanes containing units of both methylhydrosiloxane and methylvinylsiloxane by equilibration.

U.S. Pat. No. 3,843,702 discloses that trifluoromethanesulfonic acid (CF$_3$SO$_3$H), commonly referred to as triflic acid, can be a catalyst for the equilibration of lower molecular weight polysiloxanes containing neither silicon to hydrogen bonds nor silicon bonded to a vinyl group. U.S. Pat. Nos. 4,634,610 and 4,634,755 relate to the use of trifluoromethanesulfonic acid to make polysiloxanes having groups such as dimethylsiloxane and methylvinylsiloxane that do not contain silicon to hydrogen bonds. Nowhere do these references disclose an equilibration process for making a polysiloxane containing both silicon bonded to hydrogen and silicon bonded to a vinyl group.

U.S. Pat. No. 4,222,952 discloses that polysiloxanes containing silicon bonded to hydrogen can be rearranged, and, therefore, can be equilibrated, using solid perfluorinated polymers containing pendant sulfonic groups as equilibration catalysts.

U.S. Pat. No. 4,581,391 discloses that methylvinylsiloxane units in polysiloxanes increase the ablation resistance/insulation properties of diorganosiloxane polymers by forming ceramic residue or char on exposure to high temperature. In this reference, the polysiloxanes are cured by the addition of a second polysiloxane containing methylhydrosiloxane units in the presence of a crosslinking platinum catalyst.

U.S. Pat. No. 4,888,376 discloses a hydroxy-endblocked polysiloxane containing methylhydrosiloxane and methylvinylsiloxane units and a siloxy-endblocked polysiloxane having either methylhydrosiloxane units or methylvinylsiloxane units, but not both units in the same polysiloxane. The polysiloxanes of this reference are prepared by hydrolysis.

Accordingly, the prior art does not disclose siloxy-endblocked polysiloxanes containing units of both alkylhydrosiloxane and alkylvinylsiloxane that are effective ceramic precursors for silicon oxycarbide ceramic compositions. Additionally, the prior art does not disclose an equilibration process for preparing siloxy-endblocked polysiloxanes containing units of both alkylhydrosiloxane and alkylvinylsiloxane.

OBJECTIVES OF THE INVENTION

It is a primary object of the present invention to provide a polysiloxane having alkylhydrosiloxane units and alkylvinylsiloxane units Which polysiloxanes are siloxy-endblocked.

It is an object of the present invention to provide polysiloxanes that are useful as a starting material in the preparation of silicon oxycarbide ceramic compositions.

Another object of the present invention is to provide a process for preparing a siloxy-endblocked polysiloxane having alkylhydrosiloxane units and alkylvinylsiloxane units by a process of equilibration.

A further object of the present invention is to provide a process that produces a high yield of such polysiloxanes and low levels of cyclic siloxanes so as to limit the removal of the cyclic siloxanes from the polysiloxane.

Other objects and advantages of the present invention will be made apparent by the description and examples which follow.

SUMMARY OF THE INVENTION

The present invention provides a polysiloxane having the formula:

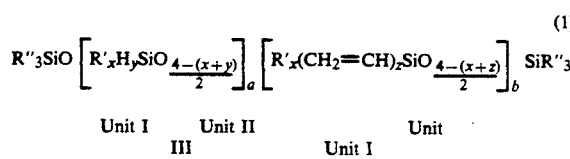

$$R''_3SiO \left[ R'_xH_ySiO_{\frac{4-(x+y)}{2}} \right]_a \left[ R'_x(CH_2=CH)_zSiO_{\frac{4-(x+z)}{2}} \right]_b SiR''_3 \quad (1)$$

Unit I  Unit II  Unit III  Unit I wherein:
R' is an alkyl group having 1 to 4 carbon atoms;
R'' is hydrogen, a vinyl group or an alkyl group having 1 to 4 atoms;
x has a value of from 1 to 2;
y has a value from 0 to 1;

z has a value from 0 to 1;
with the proviso that x+y is 2, x+z is 2, y and z each has an average value of at least 0.75; and a and b each has an average value from 2 to 100.

The present invention also provides a process for the preparation of the above-described polysiloxane which comprises:

(1) reacting in the presence of a sulfonic acid catalyst with agitation at ambient or higher temperature and pressure a reaction mixture of siloxanes containing Units I, II, and III which siloxanes are selected from at least one siloxane selected from (i) cyclic siloxanes selected from the group consisting of $(OSiR'H)_c$, $(OSiR'CH=CH_2)_c$, $(OSiR'_2)_d$, $(OSiR'H)_e(OSiR'CH=CH_2)_f$, $(OSiR'_2)_e(OSiR'H)_f$, and $(OSiR'_2)_e(OSiR'CH=CH_2)_f$ wherein c and d are positive integer ranging from 3 to 10 and e and f are positive integers and e+f equals c or d;

and one or more siloxanes selected from group (ii) or group (iii);

wherein group (ii) consists of endblocking disiloxanes of the formula:

$$R''_3SiOSiR''_3$$

and wherein group (iii) consists of linear siloxanes selected from the group consisting of $R''_3Si(OSiR'H)_gOSiR''_3$, $R''_3Si(OSiR'CH=CH_2)_gOSiR'_3$, and $R''_3Si(OSiR'_2)_gOSiR'_3$ wherein g is a positive integer ranging from 1 to 100 and wherein in group (i), (ii) and (iii) R' is an alkyl group having from 1 to 4 carbon atoms and R'' is hydrogen, an alkyl group having 1 to 4 carbon atoms, or vinyl group with the proviso that y and z each has an average value of 0.75;

(2) neutralizing the catalyst; and optionally (3) vacuum stripping the polysiloxane.

The invention further provides a silicon oxycarbide ceramic composition and a process for the conversion of the above-described polysiloxane to the silicon oxycarbide ceramic composition which process comprises heating the polysiloxane to a temperature ranging from about 500° to 1300° C. in an inert atmosphere consisting of nitrogen or argon at ambient pressure.

DETAILED DESCRIPTION OF THE INVENTION

In the present invention a polysiloxane containing both alkylhydrosiloxane and alkylvinylsiloxane units in the same polymer which polysiloxanes are siloxy-endblocked is disclosed. The polysiloxanes of the present invention are prepared by an equilibration process. Polysiloxanes of the present invention are represented by the formula:

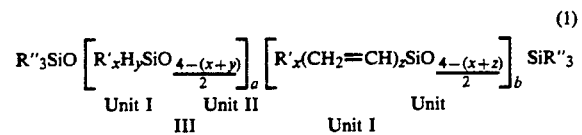

$$R''_3SiO\left[R'_xH_ySiO_{\frac{4-(x+y)}{2}}\right]_a\left[R'_x(CH_2=CH)_zSiO_{\frac{4-(x+z)}{2}}\right]_b SiR''_3 \quad (1)$$

Unit I    Unit II      Unit III    Unit I

In the formula (1) above, R' is an alkyl group having 1 to 4 carbon atoms. Preferably, R' is a methyl group. R'' in the formula (1) above is hydrogen, a vinyl group or an alkyl group having 1 to 4 atoms. Preferably R'' is hydrogen, a vinyl group, or a methyl group. Most preferably, at least 75% of the R'' groups are methyl groups.

In formula (1), x, y, and z are integers. X has a value of from 1 to 2; y has a value of from 0 or 1; and z has a value of from 0 to 1 with the proviso that x+y is 2, x+z is 2, y and z each has an average value of at least 0.75 of formula (1). Preferably, y is 1 and z is 1. Most preferably x, y, and z are each 1.

Further, in formula (1) a and b each has an average value from 2 to 100. Preferably a+b is 4 to 100, most preferably a+b is 4 to 50. In an especially preferred embodiment, a+b is 10 to 50. In formula (1), the ratio of a to b is about 0.5:1 to 1:0.5, preferably about 0.75:1 to 1:0.75, and most preferably about 1:1.

A preferred embodiment of the present invention is a polysiloxane composition according to formula (1) in which R' and R'' are methyl groups; x, y, and z are each 1; a+b is 10 to 50; and the ratio of a to b is about 1:1.

Polysiloxanes of the present invention are prepared by an equilibration process that comprises reacting at least one cyclic siloxane (i) with an endblocking disiloxane (ii) and/or a linear siloxane (iii) in the presence of a catalyst. Such siloxanes are comprised of a major portion of respective Units II and III containing silicon-bonded hydrogen and silicon-bonded vinyl groups. All of the siloxanes used herein are commercially available and/or their preparation is known to those skilled in the art.

Suitable starting materials include:

(i) Cyclic siloxanes of the formulae: $(OSiR'H)_c$, $(OSiR'CH=CH_2)_c$, $(OSiR'_2)_d$, $(OSiR'H)_e(OSiR'CH=CH_2)_f$, $(OSiR'_2)_e(OSiR'H)_f$, and $(OSiR'_2)_e(OSiR'CH=CH_2)_f$ wherein c and d are each positive integers ranging from 3 to 10 and e and f are positive integers and e+f equals c or d. Illustrative cyclic siloxanes include $(OSi(CH_3)H)_c$, $(OSi(CH_3)CH=CH_2)_c$, $(Si(CH_3)H)_e(OSi(CH_3)CH=CH_2)_f$, (ii) Endblocking disiloxanes of the formula:

$$R''_3SiOSiR''_3$$

wherein R'' is a hydrogen, a vinyl group, or an alkyl group having 1 to 4 atoms. Illustrative endblocking disiloxanes include $((CH_3)_3Si)_2O$, $(CH_2=CH(CH_3)_2Si)_2O$, and $(H(CH_3)_2Si)_2O$.

(iii) Linear siloxanes of the formulae: $R''_3Si(OSiR'H)_gOSiR''_3$, $R''_3Si(OSiR'CH=CH_2)_gOSiR''_3$, and $R''_3Si(OSiR'_2)_gOSiR''_3$ wherein g is a positive integer ranging from 1 to 100. Illustrative linear siloxanes suitable as starting materials in the process of the present invention include: $(CH_3)_3Si(OSi(CH_3)H)_gOSi(CH_3)_3$
$H(CH_3)_2Si(OSi(CH_3)H)_gOSi(CH_3)_2H$
$(CH_3)_3Si(OSi(CH_3)CH=CH_2)_gOSi(CH_3)_3$
$H(CH_3)_2Si(OSi(CH_3)CH=CH_2)_gOSi(CH_3)_2H$
$CH_2=CHSi(CH_3)_2(OSi(CH_3)H)_gOSi(CH_3)_2CH=CH_2$
and $CH_2=CH(CH_3)_2Si(OSi(CH_3)CH=CH_2)_gOSi(CH_3)_2CH=CH_2$ For reasons of commercial availability, the siloxanes of groups (i) and (ii) are preferred starting materials. Optionally, linear siloxanes (iii) may be used as starting materials in the process of the present invention.

The siloxane starting materials selected from groups (i), (ii) and (iii) above are used in an equilibration process. The siloxane starting materials are reacted in the presence of a sulfonic acid catalyst at ambient or higher temperature and pressure.

Suitable catalysts for the equilibration process of preparation of the polysiloxanes of the present invention include trifluoromethanesulfonic acid (commonly referred to as "triflic acid") and related strong soluble acids. Other forms of such acids, including insoluble crosslinked forms such as Nafion ® have been used as equilibration catalysts and can be employed in the process of the present invention. Similarly, silyl esters of triflic acid, such as $CF_3SO_3SiMe_3$ can also be used since hydrolysis by incident moisture or reaction with low levels of silanol groups will generate triflic acid. However, the preferred catalyst is trifluoromethanesulfonic acid ($CF_3SO_3H$).

In the process of the present invention, the catalyst is present in an amount ranging from about 0.02 to about 5 percent by weight, preferably 0.05 to about 0.5 percent by weight, based on the total (i) disiloxane, (ii) cyclic siloxane and/or (iii) linear siloxane used. Optionally, a solvent selected from the group consisting of acetonitrile, dimethylsulfoxide and hexamethylphosphoramide can be added to the catalyst. Preferably, the solvent is acetonitrile. When a solvent is employed it is added to the catalyst in an amount ranging from 1 to 20 times the weight of the catalyst in the reaction.

After the polysiloxane of the present invention is formed by the equilibration reaction described above, the catalyst is neutralized by the addition of from about 0.04 to 10 weight percent of an inorganic salt selected from the group consisting of sodium carbonate and sodium bicarbonate. After the catalyst is neutralized, the solid salts of the neutralized catalyst are removed by filtration, and the polysiloxane so formed may be concentrated by vacuum stripping. Another, and preferred means, of neutralizing the catalyst is by the addition of 0.04 to 10 weight percent of allyltrimethylsilane forming $F_3CSO_3SiMe_3$ and propylene which are removed by vacuum stripping. Yet another means for neutralizing the catalyst is by the addition of 0.04 to 10 weight percent of hexamethyldisilazane forming $F_3CSO_3SiMe_3$ and ammonia which are removed by vacuum stripping.

In the process of the present invention the reaction and neutralization steps are not narrowly critical and can be performed at ambient or higher temperatures and pressure in any equipment unreactive to the siloxane starting materials and catalyst. Further, the equipment can have any means for charging the individual reactants, for agitation, and for removal of the polysiloxane so produced by the process of the present invention. If desired the polysiloxanes of the present invention may be devolatilized to remove the low levels of undesired cyclic siloxanes that may be produced and these may be returned to a subsequent preparation.

Molecular weights of the polysiloxanes of the present invention are not narrowly critical and so the polysiloxanes may vary from low viscosity fluids to high viscosity fluids or semisolids. The desired viscosity or molecular weight range may depend upon the application of the ceramic composition made from the polysiloxane of the present invention. For example, if it is desired to impregnate a finely porous solid with a polysiloxane of the present invention prior to conversion to a ceramic, then the polysiloxane should be a low viscosity fluid. If, however, it is desired to make an impregnated mat by surrounding a woven, fibrous structure prior to curing and conversion to a ceramic, then the polysiloxane should be a high viscosity fluid or pourable semisolid. Those skilled in the art are familiar with the properties needed for various applications and can adapt the process of the present invention accordingly. However, the molecular weight should be high enough so that crosslinking can take place before volatilization to maintain a high ceramic yield.

CONVERSION TO SILICON OXYCARBIDE CERAMIC COMPOSITIONS

The polysiloxanes of the present invention are convertible to silicon oxycarbide compositions by themselves or in mixtures with other well known components. Such components include, for example, inorganic fillers such as silicon carbide, silicon nitride, silica and other inorganic fillers known to those skilled in the art.

The polysiloxanes of the present invention are converted by heating at an appropriate rate to a temperature of 500° or beyond, preferably 500° to 1300° C., in an inert atmosphere of nitrogen or argon at ambient or higher pressures. Pyrolysis of the polysiloxanes of the present invention can be performed in commercially available equipment designed for such work and also known to those skilled in the art. Sintering aids typical of such high temperature reactions may be employed if desired. Shaping, spinning, and casting of the polysiloxanes of the present invention can be performed in commercially available equipment designed for such purpose and known to those skilled in the art. Such ceramics are used primarily, for example, in the aerospace industry in high temperature-resistant composites, as in gas turbine blades, support structures, leading edges on spacecraft wings and the like.

Whereas the exact scope of the present invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

In the examples, all reactions took place in standard laboratory glassware, using heating mantles, mechanical or magnetic stirrers, thermometers and condensers. A nitrogen atmosphere was maintained. Pyrolysis was performed in Lindberg furnaces capable of attaining the designated temperatures and were equipped to maintain a nitrogen atmosphere. The abbreviations g, mm, ml, min, hr, and Me represent gram, millimeter, milliliter, minute, hour, and methyl ($CH_3$), respectively. Temperatures were recorded in centigrade degrees.

EXAMPLE 1

Preparation of
$HMe_2Si(OSiMeH)_{9.6}(OSiMeCH=CH_2)_8OSiMe_2H$

In a 250 ml three-necked flask fitted with thermometer, mechanical stirrer, and water condenser were combined 10.1 g (0.075 mol) of 1,1,3,3-tetramethyldisiloxane, $(HSiMe_2)_2O$, 44.5 g (0.185 mol) of 1,3,5,7-tetramethylcyclotetrasiloxane, $(OSiMeH)_4$, and 51.7 g (0.15 mol) of 1,3,5,7 tetramethyl -1,3,5,7-tetravinylcyclotetrasiloxane, $(OSi-MeCH=CH_2)_4$. A solution of $CF_3SO_3H$ in acetonitrile (10% active, 1.06 g total) was added and the mixture allowed to stir at room temperature for 72 hrs. Analysis by gas chromatography (GC) showed that equilibrium had been reached. The catalyst was neutralized with a solution of allyltrimethylsilane (10% active in petroleum ether, 1.2 g total), and the product vacuum-stripped to 40°/2 mm. Analyses by nuclear magnetic resonance (NMR) and gel permeation chromatography (GPC) confirmed the product structure.

EXAMPLE 2

Conversion of the Product of Example 1 to a Ceramic Composition

A portion of the product of Example 1, 13.7 g, was placed in a quartz boat in a quartz tube in a Lindberg tube furnace, the tube evacuated/$N_2$ purged three times, and heated under slow $N_2$ flow at a temperature program of 20°<300°<400°<500°<700°=700°>500°>20° with respective time intervals of 6, 10, 2, 10, 2, 4, and 3 hrs. The yield was 68.9% by weight of black solid ceramic composition. A portion of that solid (7.76 g) was placed in an alumina boat in an alumina tube in a separate Lindberg furnace, the tube evacuated/$N_2$ purged three times, and heated at a temperature program of 500°<800°<1000°<1200°=1200°>1000°>800°>500° with respective time intervals of 5, 16, 2, 8, 2, 2, and 3 hr. The retained weight in this step was 7.60 g (97.9% by weight), making the two step pyrolysis yield 67.5%. The product was analyzed and was found to contain 25.50% C, 0.06% H, and 46.89% Si. If the difference from 100% of the total composition is assumed to be oxygen, i.e., 27.55%, the ceramic product is calculated to be 51.63% $SiO_2$, 32.59% SiC, 15.72% C, and 0.06% H. This example shows that pyrolysis of the product of Example 1 provides a high yield of silicon oxycarbide ceramic composition.

EXAMPLE 3

Preparation of
$CH_2=CHMe_2Si$-$(OSiMe_2)_{17.2}(OSiMeH)_{4.5}$
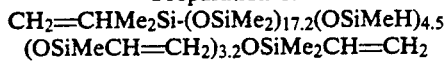

The procedure of Example 1 was followed using 164.3 g (0.25 mol) of $CH_2=CHMe_2Si(OSiMe_2)_{6.37}OSiMe_2CH=CH_2$, 199.9 g (0.674 mol) of $(OSiMe_2)_4$, 67.6 g (0.28 mol) of $(OSiMeH)_4$, 68.9 g (0.20 mol) of $(OSiMeCH=CH_2)_4$, 2.5 g of 10% active $CF_3SO_3H$ in $CH_3CN$, and 2.85 g of 10% active allyltrimethylsilane in petroleum ether. The equilibration time was 64 hr. at room temperature, followed by neutralization. Vacuum stripping at 40°/2 mm removed 9.0 g of volatiles. Analyses by GC, NMR, and GPC confirmed the structure. This example illustrates that polysiloxanes, containing a significant amount of dimethylsiloxane units ($OSiMe_2$) can be produced by the process of the present invention. However, as can be seen in Comparative Example A below, polysiloxanes having significant amounts of dimethylsiloxane units are generally not as good as the polysiloxanes of the present invention for use as ceramic precursors.

COMPARATIVE EXAMPLE A

Conversion of the Product of Example 3 to a Ceramic Composition

The procedure of Example 2 was followed through the first pyrolysis step with 8.00 g of the product of Example 3. The yield was 0.23 g (2.9%) of a silicon oxycarbide composition. This example confirms that the presence of dimethylsiloxane units ($OSiMe_2$) substantially lowers the yield of a ceramic.

EXAMPLE 4

Preparation of $Me_3Si(OSiMeH)_8(OSiMeCH=CH_2)_8OSiMe_3$

The procedure of Example 1 was repeated using 68.94 g of commercially available cyclic methylvinylcyclosiloxanes, 50.53 g of $Me_3Si(OSiMeH)_{48}OSiMe_3$, and 13.8 g of $(Me_3Si)_2O$, with 0.67 g of triflic acid dissolved in 0.67 g of acetonitrile as the catalyst. After 18 hours, equilibrium was reached and the reaction was neutralized with 0.73 g of allyltrimethylsilane. Vacuum stripping to 50°/3.3 mm provided 128.8 g of product (96.6% of theoretical). NMR Analysis confirmed the structure. This example demonstrates the production of endblocking siloxy groups which do not contain vinylic or hydrido functionality.

EXAMPLE 5

Conversion of the Product of Example 4 to a Ceramic Composition

The procedure of Example 2 was followed through the first pyrolysis step with 7.30 g of the product of Example 4. The yield was 64.5% of ceramic composition, essentially equivalent to that of Example 2. This example confirms that nonfunctional trimethylsiloxy endblocking groups do not detract substantially from the ceramic yield.

COMPARATIVE EXAMPLE B

Preparation of $(OSiMeH)_x(OSiMeCH=CH_2)_y$ Cyclosiloxanes and Conversion to a Ceramic In a one liter three-necked flask fitted with thermometer, magnetic stirrer, and additional funnel, were combined 175 ml of petroleum ether and 350 ml of water. The stirred mixture was cooled to $-1°$ by ice/salt bath, and a mixture of 56.6 g (0.49 mol) of methydichlorosilane and 69.4 g (0.49 mol) of vinylmethyldichlorosilane added over 2.5 hr. at $-1°$ to $-3°$. The two-phase reaction mixture was transferred to a separatory funnel and the lower aqueous phase discarded. The organic phase was washed five times with water (until the wash water remained neutral), dried over $MgSO_4$, filtered, 0.25 g of Cyanox 425 (inhibitor) added, and vacuum-stripped to remove solvents. Vacuum distillation provided 16.75 g of cyclosiloxanes <106°/0.05 mm in several distillation cuts, whereupon the contents of the distillation flask gelled to an infusible, insoluble solid.

A portion of the highest boiling cut from Comparative Example B, 65°-106°/0.05 mm, 4.0 g, was pyrolyzed according to the procedure of Example C below. The yield of ceramic composition was 0.03 g (0.75%). This example confirms that cyclic siloxanes containing methylhydrosiloxane units and methylvinylsiloxane units, as disclosed in K. A. Andrianov, et al., Zhur. Obshch. Khim., 35, 103 (1965), 35 524 (1965), and J. Organometal Chem., 4 440 (1965) are generally, not as effective as precursors for silicon oxycarbide ceramic compositions.

COMPARATIVE EXAMPLE C

Pyrolysis of $(OSiMeCH=CH_2)_c$ Cyclic Siloxanes, c=3, 4, 5

The procedure of Example 2 was followed through the first pyrolysis step with 17.57 g of commercially available methylvinylcyclosiloxanes, except that an aspirator (water pump) vacuum was used instead of a mechanical pump vacuum for the evacuation/$N_2$ purge cycles due to the high volatility of the siloxanes. The yield of ceramic composition was 0.85 g (4.8%). This example shows that low molecular weight cyclic polysiloxanes containing methylvinylsiloxane units do not provide good yields of ceramic.

What is claimed is:

1. A process for the conversion of a polysiloxane having the formula:

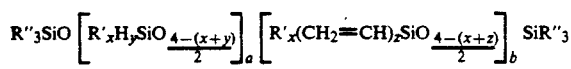

wherein:
R' is an alkyl group having 1 to 4 carbon atoms;
R'' is hydrogen, a vinyl group or an alkyl group having 1 to 4 atoms;
x has a value from 1 to 2;
y has a value from 0 to 1;
z has a value from 0 to 1;
with the proviso that x+y must equal 2, x+z must equal 2, y and z each has an average value of at least 0.75; and a and b each has an average value from 2 to 100, to a silicon oxycarbide ceramic composition which process comprises:
heating the polysiloxane to a temperature ranging from about 500° to 1300° C. in an inert atmosphere consisting of nitrogen or argon at ambient pressure.

2. A process according to claim 1 wherein y is 1 and z is 1.

3. A process according to claim 2 wherein the temperature ranges from about 500° to 650° C.

4. A process according to claim 2 wherein the molar ratio of a to b is about 1:1.

5. A process according to claim 2, wherein R' and R'' are methyl groups.

6. A process according to claim 2, wherein R' is methyl; one R'' in each endblocking unit is hydrogen or a vinyl group; x, y, and z are each 1; a+b is about 4 to 50; and the ratio of a to b is about 1:1.

7. A process according to claim 2, wherein R' is methyl; R'' is methyl; x, y, and z are each 1; a+b is about 4 to 50 and the ratio of a to b is about 1:1.

* * * * *

UNITED STATES PATENT AND TRADEMARK OFFICE
CERTIFICATE OF CORRECTION

PATENT NO. : 5,275,980
DATED : January 4, 1994
INVENTOR(S) : Schilling, Jr. et al.

It is certified that error appears in the above-indentified patent and that said Letters Patent is hereby

Column 3, lines 14-15;

"$(OSiR'H)_c$, $(OSiR'CH=CH_2)_c$, $(OSiR'_2)_d$, $(OSiR'H)_e(OSiR'CH=CH_2)_f$, $(OSiR'_2)_e(OSiR'H)_f$,"

should read

--$(OSiR'H)_c{}'$ $(OSiR'CH=CH_2)_c{}'$ $(OSiR'_2)_d{}'$ $(OSiR'H)_e(OSiR'CH=CH_2)_f{}'$ $(OSiR'_2)_e(OSiR'H)_f{}'$--

Column 3, lines 55-58;

$$\text{"}R''{}_3SiO\left[R'_xH_ySiO_{\tfrac{4-(x+y)}{2}}\right]_a\left[R'_x(CH_2=CH)_ySiO_{\tfrac{4-(x+y)}{2}}\right]_b SiR''{}_3$$

Unit I    Unit II    Unit III    Unit I "

should read $$--R''{}_3SiO\left[R'_xH_ySiO_{\tfrac{4-(x+y)}{2}}\right]_a\left[R'_x(CH_2=CH)_ySiO_{\tfrac{4-(x+y)}{2}}\right]_b SiR''{}_3$$

Unit I    Unit II    Unit III    Unit I --

Column 4, lines 26-28;

"Cyclic siloxanes of the formulae: $(OSiR'H)_c$, $(OSiR'CH=CH_2)_c$, $(OSiR'_2)_d$, $(OSiR'H)_e(OSiR'CH=CH_2)_f$, $(OSiR'_2)_e(OSiR'H)_f$, and"

cont'd. p. 2

UNITED STATES PATENT AND TRADEMARK OFFICE
CERTIFICATE OF CORRECTION

PATENT NO. : 5,275,980

DATED : January 4, 1994

INVENTOR(S) : Schilling, Jr. et al.

It is certified that error appears in the above-indentified patent and that said Letters Patent is hereby corrected as shown below:

should read

--Cyclic siloxanes of the formulae: $(OSiR'H)_c'$ $(OSiR'CH=CH_2)_c'$ $(OSiR'_2)_d'$ $(OSiR'H)_e(OSiR'CH=CH_2)_f'$ $(OSiR'_2)_e(OSiR'H)_f'$ and--

Column 4, lines 32-34;

"cyclic siloxanes include $OSi(CH_3)H_c$, $(OSi(CH_3)CH=CH_2)_c$, $(Si(CH_3)H)_e(OSi(CH_3)CH=CH_2)_f$,"

should read

--cyclic siloxanes include $OSi(CH_3)H_c'$ $(OSi(CH_3)CH=CH_2)_c'$ $(Si(CH_3)H)_e(OSi(CH_3)CH=CH_2)_f'$ --

Signed and Sealed this

Second Day of August, 1994

Attest:

BRUCE LEHMAN

Attesting Officer   Commissioner of Patents and Trademarks